United States Patent
Tanaka et al.

(10) Patent No.: US 10,249,428 B2
(45) Date of Patent: Apr. 2, 2019

(54) REACTOR

(71) Applicants: DAIKIN INDUSTRIES, LTD., Osaka (JP); TAMURA Corporation, Tokyo (JP)

(72) Inventors: Hideaki Tanaka, Osaka (JP); Kentarou Taoka, Osaka (JP); Motonobu Ikeda, Osaka (JP); Iwao Toyama, Saitama (JP); Yoshitaka Shimaya, Saitama (JP); Hiroki Imai, Saitama (JP)

(73) Assignees: DAIKIN INDUSTRIES, LTD., Osaka (JP); TAMURA Corporation, Tokyo (JP)

( * ) Notice: Subject to any disclaimer, the term of this patent is extended or adjusted under 35 U.S.C. 154(b) by 0 days.

(21) Appl. No.: 15/548,633

(22) PCT Filed: Dec. 21, 2015

(86) PCT No.: PCT/JP2015/085672
§ 371 (c)(1),
(2) Date: Aug. 3, 2017

(87) PCT Pub. No.: WO2016/125406
PCT Pub. Date: Aug. 11, 2016

(65) Prior Publication Data
US 2018/0019056 A1    Jan. 18, 2018

(30) Foreign Application Priority Data
Feb. 4, 2015  (JP) .................................. 2015-020109

(51) Int. Cl.
*H01F 27/29* (2006.01)
*H01F 37/00* (2006.01)
(Continued)

(52) U.S. Cl.
CPC ......... *H01F 27/29* (2013.01); *H01F 27/2823* (2013.01); *H01F 27/2828* (2013.01);
(Continued)

(58) Field of Classification Search
CPC ........................................... H01F 27/00–27/36
See application file for complete search history.

(56) References Cited

U.S. PATENT DOCUMENTS 4,804,340 A * 2/1989 Hamer .................... H01R 9/24
336/192
9,424,982 B2 * 8/2016 Iwakura .............. H01F 27/2828
(Continued)

FOREIGN PATENT DOCUMENTS

EP        1521358 A3    11/2005
JP     2003-243865 A     8/2003
(Continued)

OTHER PUBLICATIONS

International Search Report issued in PCT/JP2015/085672 dated Mar. 1, 2016, with translation (6 pages).
(Continued)

*Primary Examiner* — Tuyen T Nguyen
(74) *Attorney, Agent, or Firm* — Osha Liang LLP

(57) ABSTRACT

A reactor is provided. The reactor includes a coil and a terminal block that is fixed to conductor wires that led out from both ends in a winding core direction of the coil. The terminal block includes an input-side terminal block that is fixed to an input-side conductor wire that leads out from one end of the coil, and an output-side terminal block that is fixed to an output-side conductor wire that leads out from another end portion of the coil. The input-side terminal block and the output-side terminal block are disposed on different levels in the winding core direction based on lead-out positions in the winding core direction of the
(Continued)

input-side conductor wire and the output-side conductor wire.

7 Claims, 7 Drawing Sheets

(51) Int. Cl.
H01F 27/28 (2006.01)
H02M 5/458 (2006.01)
H02P 27/06 (2006.01)

(52) U.S. Cl.
CPC ............ H01F 37/00 (2013.01); H02M 5/458 (2013.01); *H02P 27/06* (2013.01)

(56) References Cited

U.S. PATENT DOCUMENTS

2002/0014941 A1* 2/2002 Yoshioka ............. H01F 27/266
336/184
2010/0079232 A1 4/2010 Okawa et al.
2013/0258602 A1* 10/2013 Hatai ................. H05K 7/20909
361/715
2016/0248333 A1 8/2016 Nakazawa et al.
2016/0347190 A1* 12/2016 Kitazawa ............. H02M 3/155

FOREIGN PATENT DOCUMENTS

| | | | |
|---|---|---|---|
| JP | 2005-130690 A | | 5/2005 |
| JP | 2007-150034 A | | 6/2007 |
| JP | 2008-98506 A | | 4/2008 |
| JP | 2008-186848 A | | 8/2008 |
| JP | 2009-076599 A | | 4/2009 |
| JP | 2010157599 A | * | 7/2010 |
| JP | 2012-156188 A | | 8/2012 |
| JP | 2013239553 A | * | 11/2013 |
| JP | 2015-019042 A | | 1/2015 |
| JP | 2015-050235 A | | 3/2015 |
| WO | 2015/053141 A1 | | 4/2015 |

OTHER PUBLICATIONS

International Preliminary Report on Patentability and Written Opinion issued in corresponding International Application No. PCT/JP2015/085672 dated Aug. 17, 2017 (18 pages).

* cited by examiner

PRIOR ART ions of the input-side conductor wire and the
REACTOR

TECHNICAL FIELD

The present invention relates to a reactor that can be used for an inverter circuit or the like of an air conditioning device.

BACKGROUND

As an air conditioning device configured to adjust an indoor temperature and humidity, there is an air conditioning device that includes a compressor and a fan that are actuated by a motor controlled by an inverter device (for example, refer to Patent Literature 1). This inverter device includes a rectifier circuit, a smoothing circuit, an inverter circuit and the like, and is provided with a reactor configured to suppress a high frequency in a DC power supply line between the rectifier circuit and the smoothing circuit.

FIG. 7 is a perspective view of a reactor according to the related art. This reactor 120 includes a coil 133 wound onto a core 131, and a terminal block 122 configured to fix conductor wires 133a, 133b, which are led out from the coil 133. Specifically, circular crimp terminals 135 are attached to the respective two conductor wires 133a, 133b led out from the coil 133, and these crimp terminals 135 are attached to the terminal block 122 with screws 136. The respective crimp terminals 135 are disposed side by side in a horizontally direction.

Patent Literature 1: Japanese Unexamined Patent Publication No. 2005-130690

While some of air conditioning devices for a building may include a plurality of compressors, in recent years, it has been considered to install a single compressor and increase output of the single compressor for downsizing of an indoor unit and the like. In this case, since a rated current of the inverter device also becomes larger, a wire diameter of the coil 133 in the reactor 120 shown in FIG. 7 naturally becomes larger.

However, when the wire diameter of the coil 133 becomes larger, bending of the wire becomes difficult, so that the conductor wires 133a, 133b cannot be bent at a large curvature between the coil 133 and the terminal block 122. Therefore, a distance from the coil 133 to the terminal block 122 will become larger, which results in an increase of the size of the reactor 120.

SUMMARY

In view of the above, one or more embodiments of the present invention provide a reactor that can be downsized.

(1) One or more embodiments of the present invention provide a reactor including a coil and a terminal block to which conductor wires led out from both ends in a winding core direction of the coil are fixed, wherein
the terminal block includes an input-side terminal block to which an input-side conductor wire led out from one end of the coil is fixed, and an output-side terminal block to which an output-side conductor wire led out from another end of the coil is fixed, and
the input-side terminal block and the output-side terminal block are disposed on different levels in the winding core direction in accordance with lead-out positions in the winding core direction of the input-side conductor wire and the output-side conductor wire, respectively.

According to one or more embodiments, bending of the input-side conductor wire and the output-side conductor wire led out from the coil can be reduced, and the terminal block is brought as close to the coil as possible, which results in the downsizing of the reactor.

(2) In one or more embodiments, the winding core direction of the coil is directed vertically, and
the input-side terminal block and the output-side terminal block are disposed on different levels in a height direction.

(3) In one or more embodiments, components different in height are connected to the input-side terminal block and the output-side terminal block, respectively in accordance with a difference in the height of the input-side terminal block and the output-side terminal block.

One or more embodiments described above allow the connection of the components to the respective terminal blocks to be easily performed.

(4) A diode module in the inverter device may be connected to the input-side terminal block, and a relay module in the inverter device may be connected to the output-side terminal block.

(5) At least one of the input-side conductor wire and the output-side conductor wire may be subjected to bending so as to be brought close to the other in a horizontal direction, and terminal connection portions of the input-side terminal block and the output-side terminal block may be disposed outside the input-side conductor wire and the output-side conductor wire in the horizontal direction, respectively.

One or more embodiments described above allow the connection of terminals of the components to the respective terminal blocks to be easily performed. Moreover, since the input-side terminal block and the output-side terminal block are disposed on different levels in the height direction, an insulation distance can be sufficiently secured even when the input-side conductor wire and the output-side conductor wire are brought close to each other.

(6) The terminal block may include terminal plates to which end portions of the conductor wires are fixed by caulking.

One or more embodiments described above allow the conductor wires to be directly connected to the terminal block without intervention of crimp terminals or the like, and a distance between the coil and the terminal block can be made shorter.

According to one or more embodiments of the present invention, the downsizing of a reactor can be achieved.

DETAILED DESCRIPTION

Hereinafter, embodiments of the present invention will be described with reference to the drawings.

Figure 1:
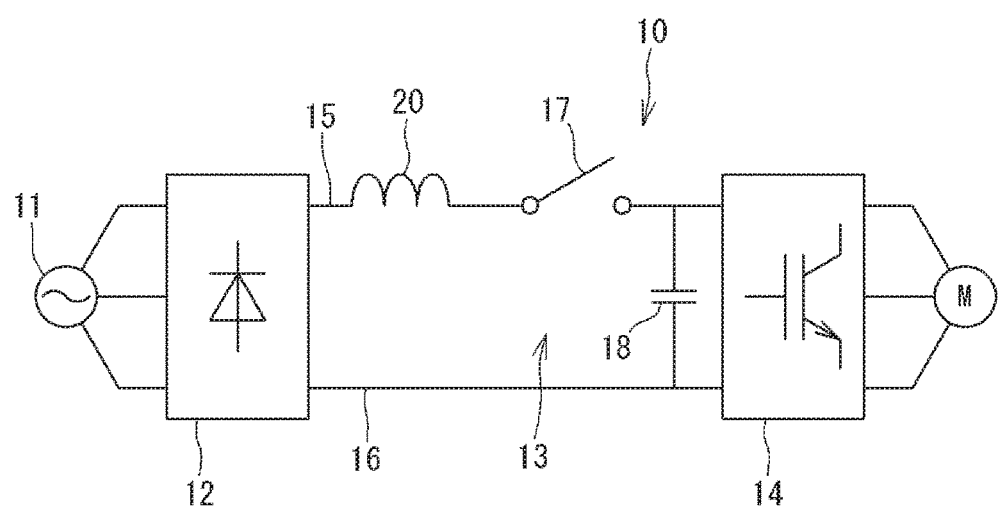
FIG. 1 is a schematic configuration view of an inverter device including a reactor according to one or more embodiments of the present invention.

FIG. 1 is a schematic configuration view of an inverter device that includes a reactor according to one or more embodiments of the present invention. This inverter device 10 is used, for example, to control a motor M configured to drive a compressor and a fan in an air conditioning device.

The inverter device 10 includes a converter circuit (rectifier circuit) 12, a smoothing circuit 13, and an inverter circuit 14.

The converter circuit 12 is connected to an AC power supply 11 and DC power supply lines 15, 16. The converter circuit 12 rectifies an AC voltage inputted from the AC power supply 11 to convert the resultant to a DC voltage, and further output the same to the DC power supply lines 15, 16. In FIG. 1, as the convertor circuit 12, a diode bridge is illustrated. However, one or more embodiments of the present invention are not limited to this. For example, an AC-DC converter configured to convert the AC voltage to the DC voltage by switching may be employed. Moreover, the AC power supply 11 may be a polyphase AC power supply, or may be a single-phase AC power supply.

The smoothing circuit 13 is connected to the converter circuit 12 through the DC power supply lines 15, 16. The smoothing circuit 13 includes a reactor 20, a relay 17, and a smoothing capacitor 18.

A reactor 20 is provided in the DC power supply line 15. The reactor 20 suppresses pulsation based on a waveform of the AC voltage inputted from the AC power supply 11, and suppresses a higher harmonic wave superimposed on a DC current flowing in the DC power supply line 15 during normal operation of the inverter circuit 14.

The relay 17 is to connect and disconnect the DC power supply line 15, and is provided in the DC power supply line 15 between the reactor 20 and the smoothing capacitor 18.

The smoothing capacitor 18 is connected between the DC power supply lines 15, 16. The smoothing capacitor 18 smoothes the DC current applied between the DC power supply lines 15, 16.

The inverter circuit 14 is connected to the smoothing circuit 13 through the DC power supply lines 15, 16. The inverter circuit 14 is configured by a plurality of switching elements (illustration is omitted). Conduction/non-conduction of these switching elements is properly controlled, by which the inverter circuit 14 converts the DC voltage smoothed by the smoothing circuit 13 to an AC voltage to apply this to the motor M. The plurality of switching elements that the inverter circuit 14 has are controlled by a control portion not shown. An output voltage of the inverter circuit 14 may be applied to a load other than the motor M.

Figure 2:
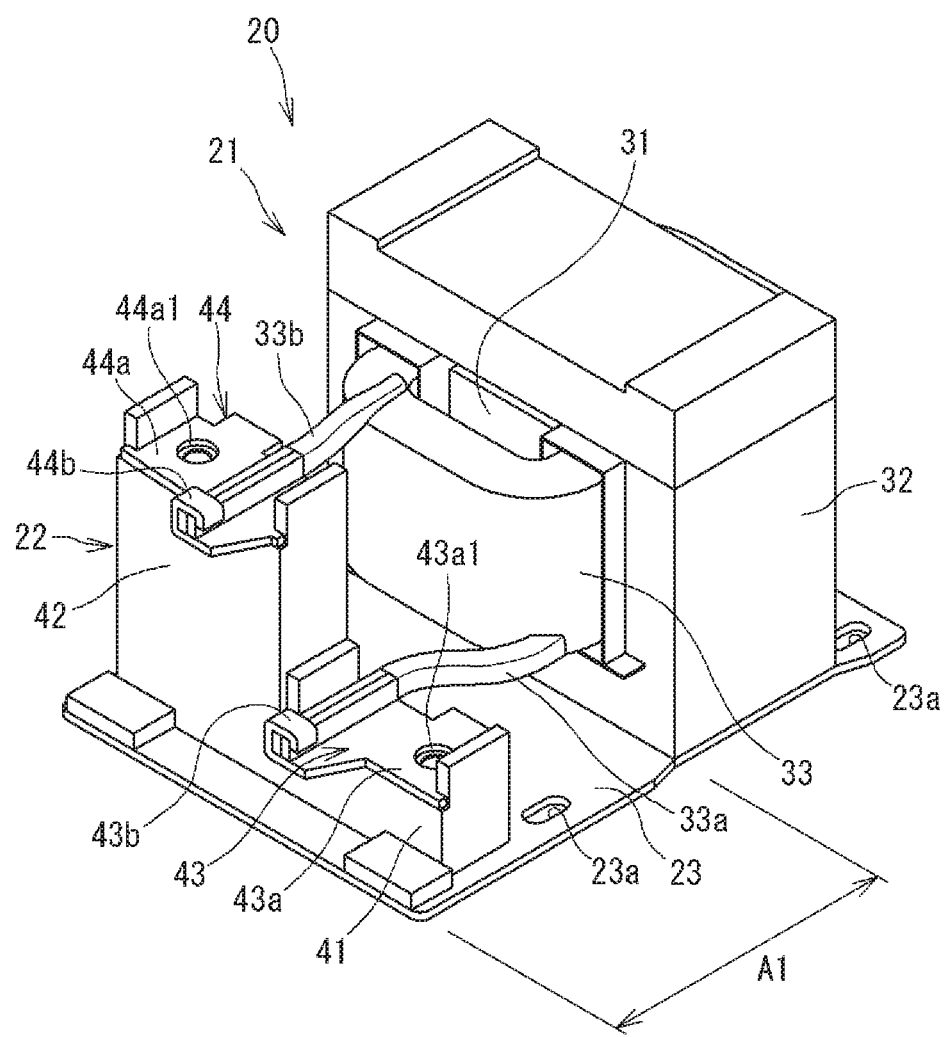
FIG. 2 is a perspective view of the reactor.
Figure 3:
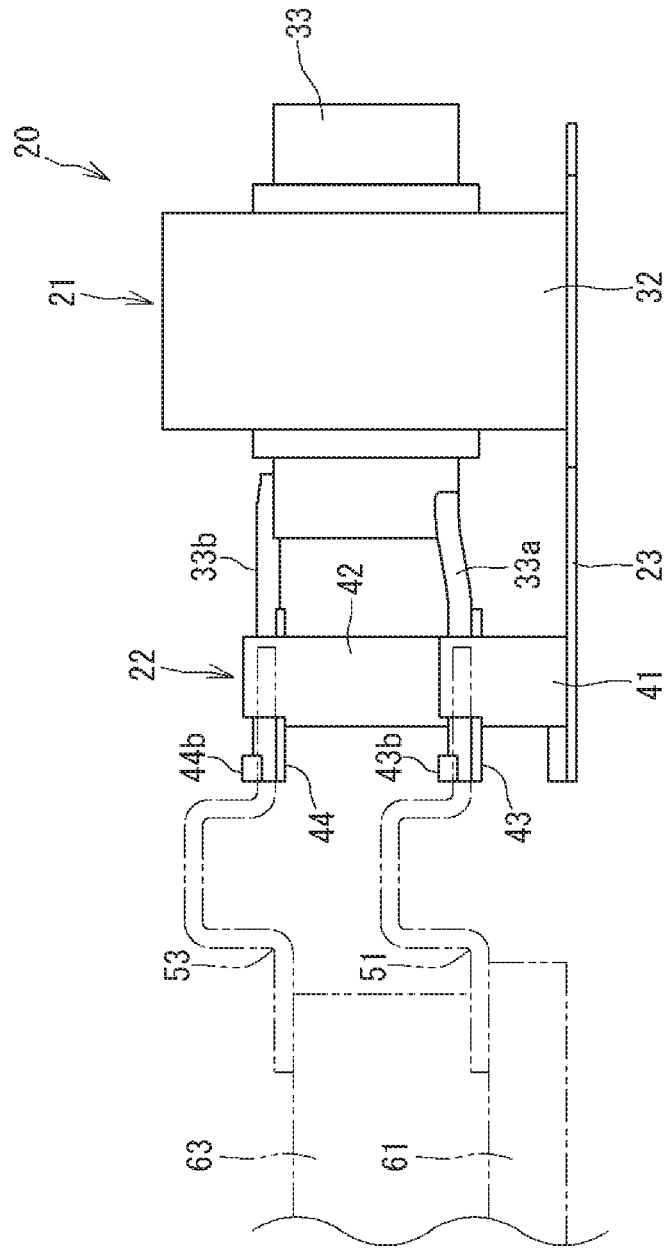
FIG. 3 is a side view of the reactor.
Figure 4:
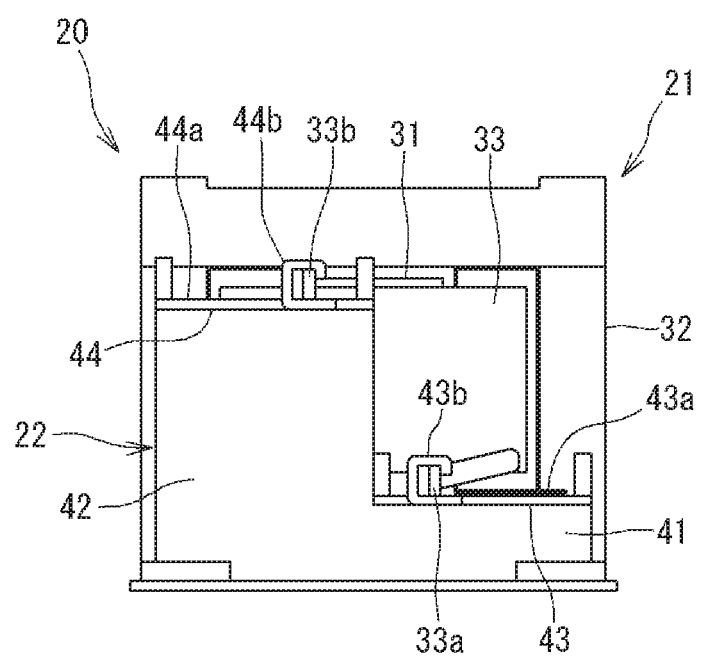
FIG. 4 is a front view of the reactor.
Figure 5:
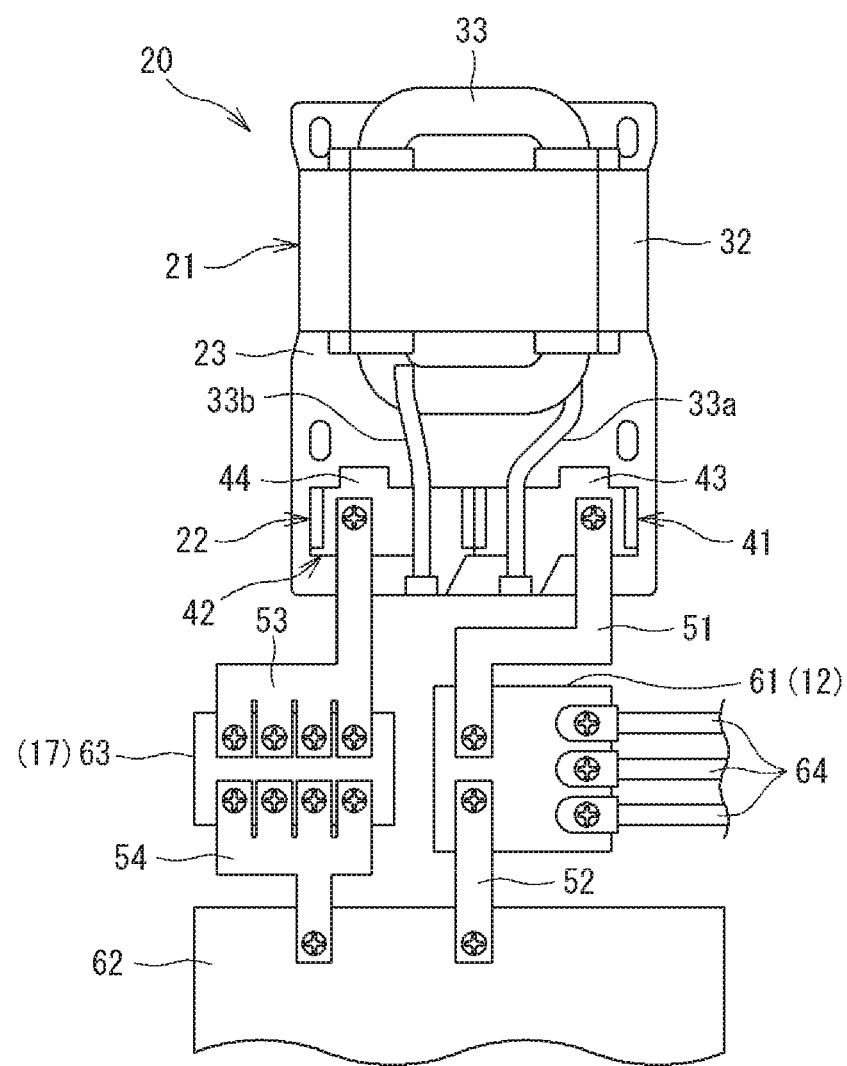
FIG. 5 is a plan view showing a connection example between the reactor and electric components.

FIG. 2 is a perspective view of the reactor, FIG. 3 is a side view of the reactor, and FIG. 4 is a front view of the reactor. Moreover, FIG. 5 is a plan view showing a connection example between the reactor and electric components.

The reactor 20 of one or more embodiments of the present invention is, for example, a reactor in a class of a rated current of 100 A. The reactor 20 includes a reactor body 21, a terminal block 22, and a support base 23. The reactor body 21 and the terminal block 22 are fixed onto the support base 23 at a distance from each other. The following description is based on a state where the reactor 20 is placed on a horizontal plane. Moreover, the reactor body 21 is disposed on a rear side, and the terminal block 22 is disposed on a front side, so that the reactor body 21 and the terminal block 22 are disposed at a distance in a front-rear direction.

The reactor body 21 has cores 31, 32, and a coil 33. The cores 31, 32 are formed of a magnetic material, and the core 31 is an internal core, which is a winding core of the coil 33, and the core 32 is an external core surrounding an outside of the coil 33.

The coil 33 is formed by winding a conductor wire around the internal core 31. The coil 33 is disposed in a state where a winding core direction is directed vertically. Conductor wires 33a, 33b at both ends of the coil 33 are led out forward from a lower end and an upper end of the coil 33, respectively.

The conductor wires 33a led out from the lower end of the coil 33 is a conductor wire on an input side, and the conductor wire 33b led out from the upper end of the coil 33 is a conductor wire on an output side. As shown in FIG. 5, the input-side conductor 33a is connected to a diode module 61 configuring the converter circuit 12 (refer to FIG. 1), and the output-side conductor wire 33b is connected to a relay module 63 including the relay 17 (refer to FIG. 1).

Figure 6:
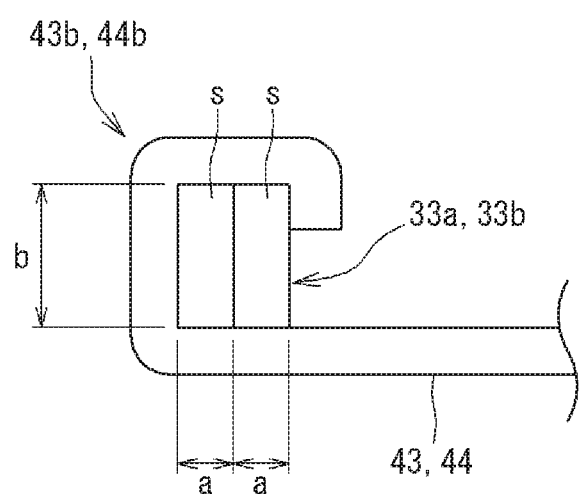
FIG. 6 is a front view showing a connection portion of a terminal plate and a conductor wire.

The conductor wire configuring the coil 33 is formed by overlapping two wire materials s formed with a rectangular cross section, as shown in FIG. 6. A dimension a of a short side in each of the wire materials s is, for example, 2 mm, and a dimension b of a long side is, for example, 5 mm.

As shown in FIG. 2, the support base 23 is formed of metal such as copper, aluminum and the like, and is configured by a plate material formed into a substantially rectangular shape in planar view. In the support base 23, a plurality of attachment holes 23a are formed.

The terminal block 22 is erected in a front portion of the support base 23. The terminal block 22 includes an input-side terminal block 41 and an output-side terminal block 42 side by side in a right-left direction. The input-side terminal block 41 disposed on the right with respect to a center in the right-left direction of the terminal block 22 is formed lower, and the output-side terminal block 42 disposed on the left with respect to the center in the right-left direction of the terminal block 22 is formed higher. Accordingly, the input-side terminal block 41 and the output-side terminal block 42 are disposed on different levels vertically (in a height direction).

Moreover, a terminal plate 43 is provided on an upper surface of the input-side terminal block 41, and to this terminal plate 43 is connected the input-side conductor wire 33a. A terminal plate 44 is provided on an upper surface of the output-side terminal block 42, and to this terminal plate 44 is connected the output-side conductor wire 33b.

In the input-side and output-side terminal plates 43, 44, terminal connection portions 43a, 44a and fixing portions 43b, 44b are provided, respectively. The terminal connection portions 43a, 44a are portions to which components to be connected such as bus bars 51, 53 (refer to FIG. 5) and the like are connected, and are formed with female screw holes 43a1, 44a1 penetrating vertically. Screws for fixing the components to be connected are screwed into these female screw holes 43a1, 44a1.

The fixing portions 43b, 44b are portions for fixing the conductor wires 33a, 33b, and as shown in FIG. 6, parts of the terminal plates 43, 44 are bent and wound around the conductor wires 33a, 33b to fix the conductor wires 33a, 33b by caulking. After being fixed to the fixing portions 43b, 44b by caulking, the conductor wires 33a, 33b are also fixed to the fixing portions 43b, 44b by soldering.

As shown in FIGS. 2 and 3, the input-side conductor wire 33a extends forward from the lower end of the coil 33, and is fixed to the fixing portion 43b of the terminal plate 43 of the input-side terminal block 41. Since the input-side terminal block 41 is disposed at the lower position, the input-side conductor wire 33a is hardly bent vertically, and extends substantially straight forward from the coil 33 to be connected to the terminal plate 43.

On the other hand, the output-side conductor wire 33b extends forward from the upper end of the coil 33, and is fixed to the fixing portion 44b of the terminal plate 44 of the output-side terminal block 42. Since the output-side terminal block 42 is disposed at the higher position, the output-side conductor wire 33b is hardly bent vertically, and extends straight forward from the coil 33 to be connected to the output-side terminal block 42.

Moreover, as shown in FIG. 5, the input-side conductor wire 33a and the output-side conductor wire 33b are disposed so as to be close to a center side in the right-left direction of the terminal block 22. Specifically, the input-side conductor wire 33a is largely bent to the slightly left side toward the center side in the right-left direction of the terminal block 22, and the output-side conductor wire 33b is bent a little to the right side toward the center side in the right-left direction of the terminal block 22. As shown in FIGS. 2 and 3, the terminal connection portion 43a of the terminal plate 43 on the input side is disposed outside the input-side conductor wire 33a in the right-left direction (on the right side), and the terminal connection portion 44a of the terminal plate 44 on the output side is disposed outside the output-side conductor wire 33b in the right-left direction (on the left side).

As shown in FIG. 5, the input-side terminal block 41 of the reactor 20 is connected to the diode module 61 configuring the converter circuit 12 through the bus bar 51. Moreover, the diode module 61 is connected to a printed board 62 through a bus bar 52. To the diode module 61 are connected power lines 64 from the AC power supply 11 (refer to FIG. 1).

On the printed board 62 are mounted the inverter circuit 14, the smoothing capacitor 18 and the like (refer to FIG. 1) in the inverter device 10. The output-side terminal block 42 of the reactor 20 is connected to the relay module 63 including the relay 17 through the bus bar 53. Moreover, the relay module 63 is connected to the printed board 62 through a bus bar 54.

In one or more embodiments described above, in the reactor 20 of one or more embodiments as shown in FIGS. 2 and 3, since the input-side terminal block 41 and the output-side terminal block 42 are disposed on different levels in the height direction in accordance with lead-out heights of the input-side conductor wire 33a and the output-side conductor wire 33b from the coil 33, the bends of the input-side conductor wire 33a and the output-side conductor wire 33b between the coil 33 and the terminal block 22 can be reduced. Thus, even if the wire diameter of the conductor wire forming the coil 33 becomes larger due to an increase in the rated current of the reactor 20, a distance between the terminal block 22 and the coil 33 can be made as small as possible, which allows the reactor 20 to be downsized.

Moreover, since the input-side terminal block 41 and the output-side terminal block 42 are disposed on different levels in the height direction, the connection of the bus bars 51, 53 to the terminal connection portions 43a, 44a of the respective terminal blocks 41, 42 can also be easily performed.

Furthermore, since the input-side terminal block 41 and the output-side terminal block 42 are disposed on different levels in the height direction, even when the input-side conductor wire 33a and the output-side conductor wire 33b respectively connected to the input-side terminal block 41 and the output-side terminal block 42 are brought closer to the center in the right-left direction of the terminal block 22, an insulation distance between the input-side terminal block 41 and the output-side terminal block 42 can be sufficiently secured.

Moreover, since the terminal connection portion 43a of the input-side terminal block 41 and the terminal connection portion 44a of the output-side terminal block 42 are disposed at positions apart from each other with the input-side conductor wire 33a and the output-side conductor wire 33b interposed, working for connecting the bus bars 51, 53 to the respective terminal connection portions 43a, 44a can be easily performed. Moreover, when the input-side conductor wire 33a and the output-side conductor wire 33b are disposed close to each other in the right-left direction, a width of each of the terminal connection portions 43a, 44a can be widely secured, and thus, connection workability of the bus bars 51, 53 can be further increased.

As shown in FIG. 3, the diode module 61 and the relay module 63 are different in height, and the diode module 61 to be connected to the input-side terminal block 41 at the lower position is lower than the relay module 63 to be connected to the output-terminal block 42 at the higher position. This can make small a difference in height between the diode module 61 and the input-side terminal block 41, and can make small a difference in height between the relay module 63 and the output-side terminal block 42. Accordingly, a structure of the bus bars 51, 53 for connecting these can be simplified.

Figure 7:
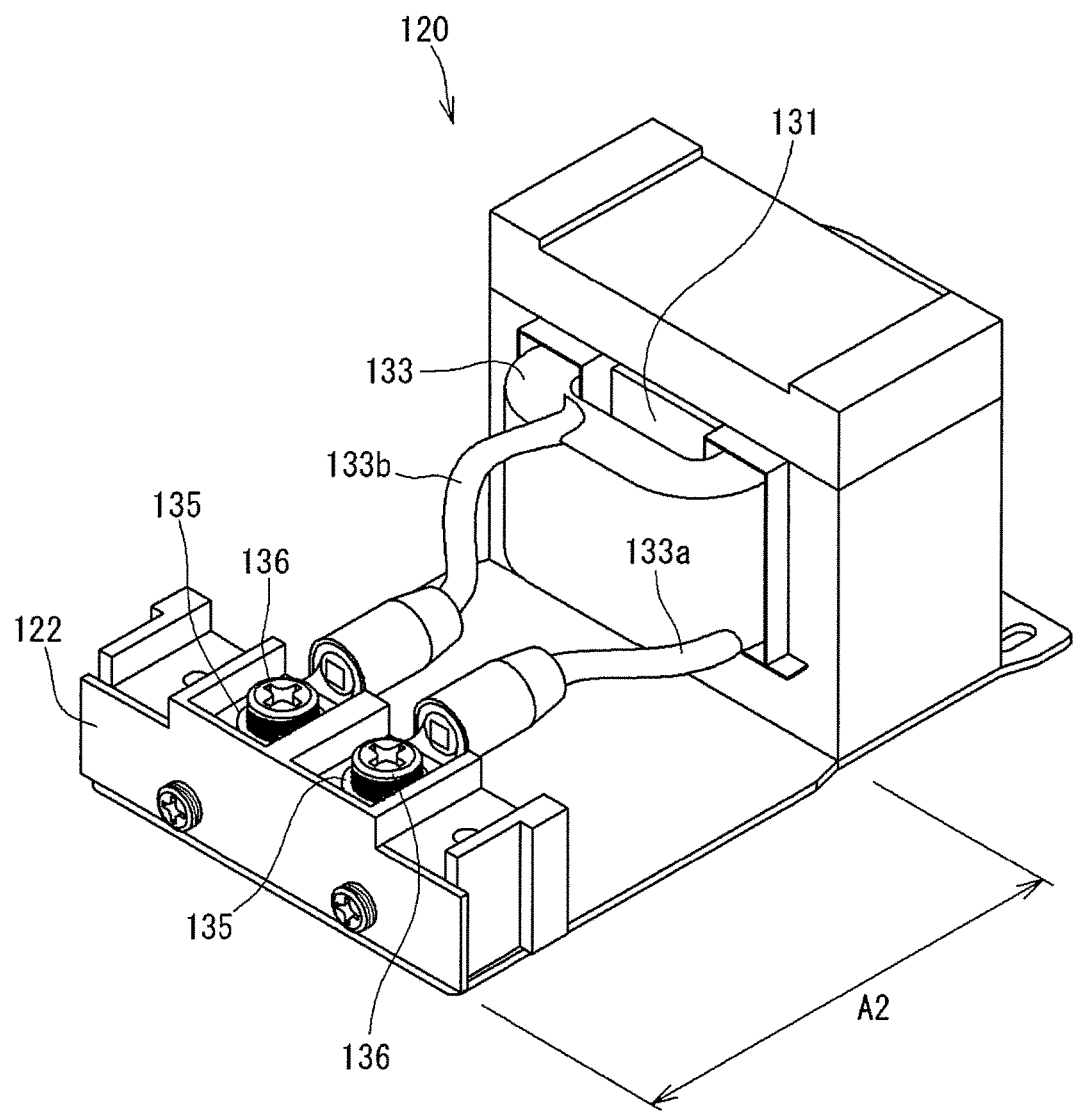
FIG. 7 is a perspective view of a reactor according to the related art.

Moreover, in the related art shown in FIG. 7, since the circular crimp terminals 135 are attached to forefronts of the conductor wires, and these crimp terminals 135 are connected to the terminal block 122, the terminal block 122 and the coil 133 need to be disposed further apart from each other by a length of each of the crimp terminals 135. However, in one or more embodiments, since the conductor wires 33a, 33b are directly fixed to the respective terminal plates 43, 44 of the input-side terminal block 41 and the output-side terminal block 42 by caulking, the terminal block 22 and the reactor body 21 can be disposed closer to each other.

In the reactor 20 of one or more embodiments of the present invention shown in FIG. 2 (a length in the front-rear direction of the support base 23 is about 122 mm), and the reactor 120 according to the related art shown in FIG. 7, if the conductor wires of the same size (refer to FIG. 6) are used to form the coils 33, 133, as to distances A1, A2 to front ends of the respective terminal blocks 22, 122, A1=65 mm, and A2=96 mm, and thus, in one or more embodiments, the distance can be shortened by about 30 mm. Moreover, one or more embodiments of the present invention can be applied to, for example, a reactor having the rated current of 75 A ore more where bending of the conductor wires is difficult.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in one or more embodiments, the reactor 20 is not limited to the inverter device 10 of the air conditioning device, but can be applied to an inverter device 10 of another device, or can also be applied to a device other than the inverter device 10.

With respect to the coil 33 of the reactor 20, the input-side conductor wire 33a may be led out from the upper end, and the output-side conductor wire 33b may be led out from the lower end. The winding core direction of the coil 33 of the reactor 20 is not limited to the vertical direction, but may be a horizontal direction.

Moreover, components connected to the input-side terminal block 41 and the output-side terminal block 42 are not limited to the diode module 61 and the relay module 63, but may be other components.

REFERENCE SIGNS LIST

10: INVERTER DEVICE
20: REACTOR
22: TERMINAL BLOCK
33: COIL
33a: INPUT-SIDE CONDUCTOR WIRE
33B: OUTPUT-SIDE CONDUCTOR WIRE
41: INPUT-SIDE TERMINAL BLOCK
42: OUTPUT-SIDE TERMINAL BLOCK
43: TERMINAL PLATE
43a: TERMINAL CONNECTION PORTION
44: TERMINAL PLATE
44a: TERMINAL CONNECTION PORTION
61: DIODE MODULE
63: RELAY MODULE

The invention claimed is:
1. A reactor comprising:
a coil;
a reactor body;
a support base; and
a terminal block that is fixed to a plurality of conductor wires that lead out from both ends in a winding core direction of the coil,
wherein the terminal block includes:
   an input-side terminal block that is fixed to an input-side conductor wire that leads out from one end of the coil; and
   an output-side terminal block that is fixed to an output-side conductor wire that leads out from another end of the coil,
wherein the input-side terminal block and the output-side terminal block are disposed on different levels in the winding core direction based on lead-out positions in the winding core direction of the input-side conductor wire and the output-side conductor wire,
wherein the reactor body and the terminal block are fixed, respectively, onto the front side and the rear side of the support base, at a distance from each other,
the input-side terminal block holds a tip of the input-side conductor wire in parallel with a tip of the output-side conductor wire that is held by the output-side terminal block, and
a terminal connection portion of the input-side terminal block and a terminal connection portion of the output-side terminal block that connect the reactor to electric components are respectively disposed, in a winding core direction of the coil, outside the tip of the input-side conductor wire and the tip of the output-side conductor wire.

2. The reactor according to claim 1, wherein
the winding core direction of the coil is directed vertically with respect to a core, and
the input-side terminal block and the output-side terminal block are disposed on different levels in a height direction.

3. The reactor according to claim 2, wherein components that are different in height are connected to the input-side terminal block and the output-side terminal block, based on a difference in the height of the input-side terminal block and the output-side terminal block.

4. The reactor according to claim 3, wherein a diode module of an inverter device is connected to the input-side terminal block, and a relay module of the inverter device is connected to the output-side terminal block.

5. The reactor according to claim 2, wherein
at least one of the input-side conductor wire and the output-side conductor wire is subjected to bending to be brought within a predetermined distance from one another in a horizontal direction.

6. The reactor according to claim 1, wherein the terminal block includes a plurality of terminal plates that are fixed to end portions of the conductor wires by caulking.

7. The reactor according to claim 1, wherein
the terminal connection portion of the input-side terminal block is disposed closer to the coil side than the tip of the input-side conductor wire,
the terminal connection portion of the output-side terminal block is disposed closer to the coil side than the tip of the output-side conductor wire, and
the tip of the input-side and the tip of the output-side conductor wires are fixed to the input-side terminal block and the output-side terminal block, respectively.

* * * * *